(12) United States Patent
Groth et al.

(10) Patent No.: US 9,773,347 B2
(45) Date of Patent: Sep. 26, 2017

(54) INTERACTING WITH A THREE-DIMENSIONAL OBJECT DATASET

(71) Applicant: KONINKLIJKE PHILIPS N.V., Eindhoven (NL)

(72) Inventors: Alexandra Groth, Hamburg (DE); Helko Lehmann, Aachen (DE); Juergen Weese, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 1 day.

(21) Appl. No.: 14/356,413

(22) PCT Filed: Oct. 15, 2012

(86) PCT No.: PCT/IB2012/055601
§ 371 (c)(1),
(2) Date: May 6, 2014

(87) PCT Pub. No.: WO2013/068860
PCT Pub. Date: May 16, 2013

(65) Prior Publication Data
US 2014/0306918 A1    Oct. 16, 2014

Related U.S. Application Data

(60) Provisional application No. 61/556,851, filed on Nov. 8, 2011.

(51) Int. Cl.
*G06F 3/041* (2006.01)
*G06T 19/00* (2011.01)
(Continued)

(52) U.S. Cl.
CPC ............ *G06T 19/003* (2013.01); *G06F 3/041* (2013.01); *G09B 23/28* (2013.01); *G09B 23/30* (2013.01);
(Continued)

(58) Field of Classification Search
CPC ........ G09B 23/28; G09B 23/30; G09B 23/34; G06F 3/041; G06F 2203/0383; G06T 19/003
(Continued)

(56) References Cited

U.S. PATENT DOCUMENTS 5,740,802 A     4/1998   Nafis et al.
6,049,819 A *   4/2000   Buckle .................... G06F 9/465
                                                707/999.01
(Continued)

FOREIGN PATENT DOCUMENTS

CN      101645176 A    2/2010
CN      201590213 U    9/2010
(Continued)

OTHER PUBLICATIONS

Subramanian, S. "Tangible interfaces for volume navigation". Eindhoven Technische Universiteit, Eindhoven, The Netherlands, 2004.
(Continued)

*Primary Examiner* — Amare Mengistu
*Assistant Examiner* — Stacy Khoo (57) ABSTRACT

A system (20) for interacting with a three-dimensional object dataset comprises a signal input (21) for receiving a signal from an interaction device (34) comprising a touch sensitive surface (35) having a typical shape of at least part of an object represented by the three-dimensional object dataset, wherein the signal is indicative of a location on the touch sensitive surface (35) that is touched. The system further comprises a mapping unit (22) for mapping the touched location to a corresponding point of the object represented by the three-dimensional object dataset. The
(Continued)

three-dimensional object dataset is based on a signal obtained from a scanner (24) arranged for scanning the object.

20 Claims, 4 Drawing Sheets

(51) Int. Cl.
    *G09B 23/28*     (2006.01)
    *G09B 23/30*     (2006.01)
    *G09B 23/34*     (2006.01)

(52) U.S. Cl.
    CPC ...... *G09B 23/34* (2013.01); *G06F 2203/0383* (2013.01)

(58) Field of Classification Search
    USPC ............ 345/156–179; 178/18.01–18.09
    See application file for complete search history.

(56) References Cited

U.S. PATENT DOCUMENTS

| | | |
|---|---|---|
| 6,575,757 B1 | 6/2003 | Leight et al. |
| 6,720,956 B1 | 4/2004 | Honma et al. |
| 7,225,115 B2 | 5/2007 | Jones |
| 7,376,903 B2 | 5/2008 | Morita et al. |
| 8,144,129 B2 | 3/2012 | Hotelling et al. |
| 8,403,677 B2 | 3/2013 | Riener et al. |
| 8,480,408 B2 | 7/2013 | Ishii et al. |
| 2006/0183096 A1 | 8/2006 | Riener et al. |
| 2008/0309634 A1 | 12/2008 | Hotelling et al. |
| 2010/0245344 A1* | 9/2010 | Chen ............ G06T 19/00 345/419 |
| 2010/0312096 A1 | 12/2010 | Guttman et al. |
| 2014/0306918 A1 | 10/2014 | Groth et al. |

FOREIGN PATENT DOCUMENTS

| | | |
|---|---|---|
| CN | 102117378 A | 7/2011 |
| JP | 2003323140 A | 11/2003 |
| JP | 2004348095 A | 12/2004 |
| JP | 2006085564 A | 3/2006 |
| JP | 2008085641 A | 4/2008 |
| WO | 0213164 A1 | 2/2002 |
| WO | 2004061797 A1 | 7/2004 |
| WO | 2006085268 A1 | 8/2006 |
| WO | 2010097771 A2 | 9/2010 |
| WO | 20140539432 A2 | 9/2010 |

OTHER PUBLICATIONS

Shani, U. "The Tracking Cube: A Three-Dimensional Input Device". IBM Technical Disclosure Bulletin, IBM, Thornwood, NY, vol. 32, No. 3B, Aug. 1, 1989, pp. 91-95.

Acosta, E.J. "Stable Haptic Virtual Reality Application Development Platform". Texas Tech University, Aug. 2006.

Displax Interactive Systems. "Displax Unveils Multitouch Skin that Transforms Surfaces into Interactive Screens". http://www.displax.com/arq/fich/DISPLAX_unveils_Multitouch_-_FINAL_Feb2_2010_0.pdf.

Ecabert, O. et al. "Towards Automatic Full Heart Segmentation, Application to Cardiac Multi-slice Computed Tomography Images", Technical note TN-2005-00583, Philips Research Laboratories, Aachen (2005).

Ecabert, O. et al. "Automatic Model-based Segmentation of the Heart in CT Images" IEEE Transactions on Medical Imaging 2008, 27(9), 1189-1201.

Subramanian, S. "Tangible interfaces for volume navigation", PhD thesis, Eindhoven: Technische Universiteit Eindhoven, 2004.

\* cited by examiner

INTERACTING WITH A THREE-DIMENSIONAL OBJECT DATASET

This application is a national stage application under 35 U.S.C. §371 of International Application No. PCT/IB2012/055601 filed on Oct. 15, 2012 and published in the English language on May 16, 2013 as International Publication No. WO/2013/068860, which claims priority to U.S. Application No. 61/556,851 filed on Nov. 8, 2011, the entire disclosures of which are incorporated herein by reference.

FIELD OF THE INVENTION

The invention relates to interacting with a three-dimensional object dataset.

BACKGROUND OF THE INVENTION

In many diagnostic tasks as well as for intervention planning and outcome control, a physician can interact with three-dimensional images. For example, in cardiology, a physician can review and interact with cardiac images and related information. Examples of possible interaction functionalities that may be provided by a review workstation include re-orientation, i.e. rotating, of images to show specific structures; annotation of landmarks, organ subparts or pathologies; indication of points for measurements; correcting automatically generated annotation and/or segmentation results; manipulating the anatomy to illustrate the outcome of an intervention; and the indication of specific structures for reporting.

Such interaction is typically facilitated by using electronic shape models resulting from automatic segmentation of medical images that are displayed on the computer screen, for example to enable a user to select points for measurements or to generate specific views of the three-dimensional shape from a particular point of view. Such interaction with the cardiac model typically takes place with devices such as a keyboard, a touch screen, or a computer mouse, and users may have difficulty performing the desired interaction tasks.

Alternative interaction devices also exist. For example, there are known simulator devices that can be used for didactic and training scopes, also for robotic surgery, namely devices that prearrange a simulation environment and are able to reproduce the tactile and visual reactions perceived while carrying out a particular procedure or the use of a particular surgical instrument.

WO 2010097771 discloses a method for surgical training comprising introducing in a processing unit clinical data detected by means of suitable medical instrumentation; processing said clinical data in a way as to obtain, through a segmentation process, a tridimensional anatomical model of an anatomical environment, that can be viewed through a graphical interface; assigning to said tridimensional anatomical model respective biomechanical properties in a way as to obtain a physical anatomical model of said anatomical environment; prearranging virtual surgical instruments and respective force feedback control means, suitable to simulate through said graphical interface a physical interaction between said virtual surgical instruments and said physical anatomical model, as well as to render the tactile perception of said interaction; and simulating through the operation of said control means exploration procedures and/or surgical procedures on said physical anatomical model by means of said virtual surgical instruments.

WO 0213164 discloses a solid-state sensing system, such as a tactile sensing system, used in conjunction with a physical model of a part of the human body, to serve as an input device to a computer system. Upon application of pressure by a user during a physical examination of the model or part of anatomy, the sensing system detects the level and location of the pressure and sends it to a computer system. The computer system is programmed to accept these inputs and interpret them for display to the person being trained and to any associated instructor for evaluation of the physical examination. An example thereof is a silicone breast model along with a solid-state sensing system and data acquisition modules to collect data on examination performance, e.g., finger placement and palpation level. Feedback regarding the user's performance is presented to the user in an easily readable graphical format.

"Tangible interfaces for volume navigation", by S. Subramanian, Eindhoven: Technische Universiteit Eindhoven, 2004, PhD thesis, discloses a tangible interface called "Passive Interface Props". The PassProps contains a head prop and a cutting-plane prop. The six degrees of freedom that specify the position of each individual prop are tracked using wired flock-of-birds trackers. Visual feedback of the user's actions is provided on a computer display positioned in front of the user. The head prop is used to manipulate the orientation of the patient's anatomy data. The user is also provided with a cutting-plane prop in the dominant hand. This latter prop can be used to specify the translation and orientation of an intersection plane through the 3D data. The user holds the cutting plane prop relative to the head prop to specify the location and orientation of the slice. The generated intersection image is presented on the display, next to the 3D model.

SUMMARY OF THE INVENTION

It would be advantageous to provide an improved interaction with a three-dimensional object dataset. To better address this concern, a first aspect of the invention provides a system comprising a signal input for receiving a signal from an interaction device comprising a surface having a typical shape of at least part of an object represented by the three-dimensional object dataset, wherein the signal is indicative of a location on the surface that is indicated by a user; and a mapping unit for mapping the indicated location to a corresponding point of the object represented by the three-dimensional object dataset.

The system allows the user to interact with the three-dimensional object dataset in a more natural way, because the user can indicate a position on the surface of a physical object having the shape of the same kind of object, to indicate a corresponding position in the three-dimensional object dataset. This way, the interaction becomes more natural. The surface of the object makes the interaction more user friendly, because the touched location is associated by the system with a corresponding position in the three-dimensional object dataset. This way, complicated interaction using a mouse or other input device can be reduced or avoided.

The surface may comprise a touch sensitive surface. The signal may be indicative of a location on the touch sensitive surface that is touched. Touching the surface is a natural way for a user to indicate a position on the surface. Consequently, the touch sensitive surface that has a typical shape of at least part of an object represented by the three-dimensional object dataset is a convenient tool to interact with a three-dimensional object dataset.

The three-dimensional object dataset may be based on a signal obtained from a scanner. Such a scanner may be arranged for scanning the object of the particular kind. The three-dimensional object dataset thus may represent specific shape information of an object in the real world. The shape of the interaction device may generally correspond to the shape of an object of the same kind. For example, it may have an average shape or a modeled shape generally having the features that are regularly found on such an object.

The object may comprise an anatomical object. In such a case, both the three-dimensional object dataset and the interaction device may have the shape of such an anatomical object. It may be the case that the interaction device has a more generic shape of a typical example of the anatomical object, whereas the three-dimensional object dataset may be patient specific. However, this is not a limitation. The scanner may comprise a medical image scanner. This is a convenient kind of scanner to obtain a patient-specific three-dimensional object dataset.

The mapping unit may be arranged for mapping the indicated location to the corresponding point of the object represented by the three-dimensional object dataset, based on the registration of the three-dimensional object dataset to an electronic representation of the shape of the surface. This is an efficient way to map positions on the surface with positions within the three-dimensional object dataset.

The system may comprise a graphical unit for displaying at least part of the three-dimensional object dataset. This allows the user to look at the displayed three-dimensional object dataset to view the specifics and/or details of the object, while the interaction device may be used to indicate a position in the object. This display may take place on a separate monitor screen, for example.

The graphical unit may be arranged for displaying an indication of the position within the three-dimensional object dataset corresponding to the location on the surface where the interaction device was touched. This makes the connection between the touched position of the interaction device and the indicated position in the three-dimensional object dataset clearly visible for the user, so that the user may interact with the system with increased confidence.

The system may comprise a user input receiver (28) arranged for receiving a command to be executed in respect of the position within the three-dimensional object dataset corresponding to the location on the surface (35) indicated by the user. This allows the user to specify with ease the position in respect of which a command is to be executed.

The command may comprise attaching an annotation to the position within the three-dimensional object dataset corresponding to the location on the surface where the interaction device was touched. The system may comprise an annotation unit for, in response to the command, attaching an annotation to the position within the three-dimensional object dataset corresponding to the location on the surface indicated by the user. This makes annotating a three-dimensional object dataset easier.

The system may comprise an ontology comprising a plurality of terms describing different parts of the object, and wherein the mapping unit is arranged for mapping the indicated position to a term describing a part of the object corresponding to the indicated position. This allows creating a system that has semantic knowledge of the touched position.

The system may comprise a connection to a patient record information system. The connection may be arranged for retrieving data from a patient data record, based on the term describing the part of the object corresponding to the touched position. This is a convenient use of the ontology linked to the input device. The system can automatically retrieve and, for example, display patient-specific information relating to the touched part of the object. The system may also be linked to a generic knowledge base for retrieving generic information that applies to the touched part.

The interaction device may comprise a movable part that is movable with respect to the remainder of the interaction device and wherein the movable part and the remainder represent different parts of the object, and the movable part is arranged for being united with and separated from the remainder part, wherein at least part of the touch sensitive surface is covered by the movable part when the movable part is united with the remainder part. For example, an object may comprise several constituent parts. These parts may be represented in the interaction device by separate physical objects. Part of the touch sensitive surface covering one of these physical objects may be covered by another one of the physical objects when the physical objects are joined to form the representation of the complete object. This feature allows the user to indicate locations inside the object, on the boundary of the constituent parts. Moreover, alternative exchangeable variants of such parts may be provided. These variants may represent alternative shapes. For example, commonly occurring anatomical variations may be catered by providing an alternative part for each variation. An indication means may be provided to enable the user to indicate which alternative part to use. This way, it is not necessary to provide complete interaction devices for every possible anatomical variation. Instead, only the varying parts need to be provided. The interaction device also becomes expandable by adding more parts to it.

The surface may comprise a display arranged for displaying information based on the three-dimensional object dataset. This display may be integrated with the surface, and have the same shape. In the case of a touch sensitive surface, the touch sensitive surface may comprise or be a touch sensitive display arranged for displaying information based on the three-dimensional object dataset. This touch sensitive display may also have the shape of at least part of a surface of the particular kind of object. For example, the surface may comprise two layers, one for the display and one for the touch sensitivity. This touch sensitive display allows displaying a three-dimensional object with increased reality. Moreover, it further improves the hand-eye coordination of the user when interacting with the three-dimensional object dataset. It also is possible to display additional information relating to particular positions within the three-dimensional object dataset. The touch sensitive display may be used to display, for example, a simulation result, a scar, or an annotation with text from an ontology associated with the position on the surface. This information displayed on the touch sensitive surface may comprise information from the three-dimensional object dataset or information linked to positions in the three-dimensional object dataset.

The system may be included in a workstation. Such a workstation may comprise a main display for displaying the three-dimensional object dataset, for example a two-dimensional rendering thereof. Moreover, a keyboard and/or mouse may be provided as additional user input means.

In another aspect, the invention provides an interaction device for interacting with a three-dimensional object dataset, comprising
a surface having a typical shape of at least part of an object represented by the three-dimensional object dataset; and a signal generator for generating a signal indicative of a location on the touch sensitive surface that is indicated by a user.

Such an interaction device may be used in conjunction with the above-mentioned system for interacting with a three-dimensional object dataset.

In another aspect, the invention provides a method of interacting with a three-dimensional object dataset, comprising receiving a signal from an interaction device comprising a touch sensitive surface having a typical shape of at least part of an object represented by the three-dimensional object dataset, wherein the signal is indicative of a location on the touch sensitive surface that is indicated by a user; and mapping the indicated location to a corresponding point of the object represented by the three-dimensional object dataset.

In another aspect, the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful.

Modifications and variations of the image acquisition apparatus, the workstation, the system, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter.

DETAILED DESCRIPTION OF EMBODIMENTS

Figure 1:
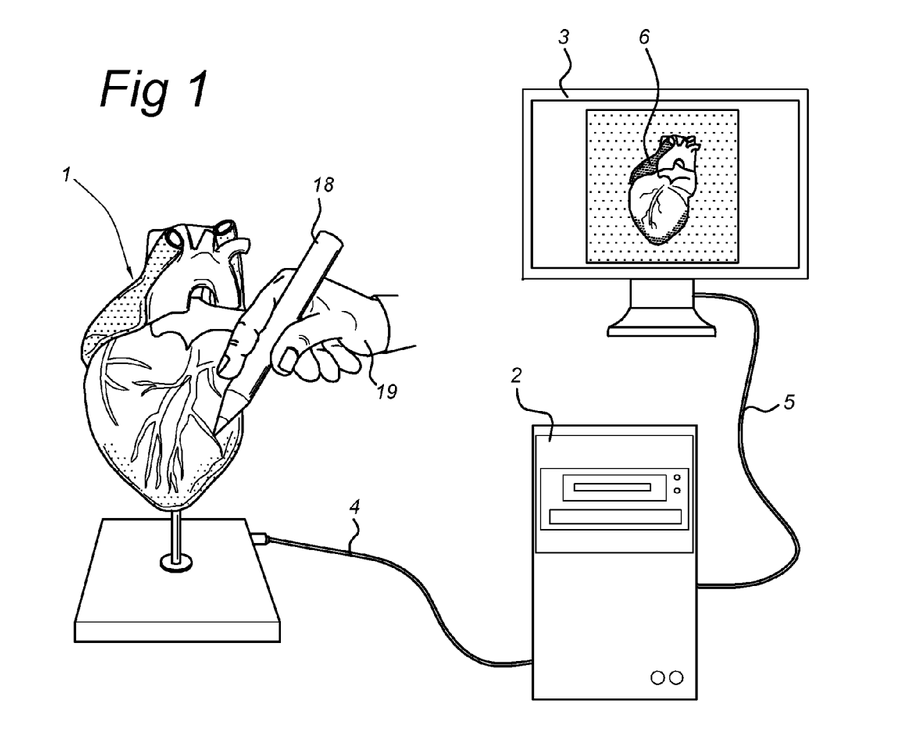
FIG. 1 is a sketch of a system for interacting with a three-dimensional object dataset.

FIG. 1 illustrates a setup with a personal computer 2, a display device 3, and an interaction device 1. The display device 3 is connected to the personal computer 2 via a cable 5 and the interaction device 1 is connected to the personal computer 2 via a cable 4. Other peripherals, such as a keyboard and/or a mouse, may be connected to the personal computer 2, but are not shown. The connections need not be implemented by means of cables 4, 5. They may be connected by other means, such as wireless communication means, known in the art per se. The personal computer 2 with display device 3 is only shown as an example of a workstation, or more generally, an example of a processing system 20, that may be used in connection with the interaction device 1. Other kinds of workstation, such as a thin client terminal or a laptop, may also be used. It is also possible that the processing system is part of a larger network including a plurality of computing devices, such as servers. The computer 2 is arranged to display a rendering 6 of a three-dimensional object dataset on the display device 3.

The figure further illustrates schematically a user's hand 19 holding a stylus 18. The stylus may be any kind of stylus, or any other suitable object, depending on the kind of touch sensitive surface that is used. The user touches the surface of the interaction device 1 with the stylus 18. The information resulting from this event is communicated to the personal computer 2 via the cable 4. The use of a stylus is not a limitation. Other kinds of touch event may also be detected and signaled to the personal computer 2. In particular, the touch of a finger can be detected. This depends on the particular touch sensing technology used.

The interaction device 1 is a physically available and touchable three-dimensional model of the heart anatomy that can be used to interact with cardiac images and related information that is available to the computer 2. An electronic representation of the shape of the physical model may be available to the computer 2, for example in the form of a shape model. An example of a shape model is a surface mesh. This and other kinds of shape models are known in the art per se. The electronic representation may comprise precise information of the shape and/or dimensions of the physical model. Moreover, a coordinate system or an indexing system may be defined to be able to denote individual points of the physical three-dimensional model. The interaction device 1 is arranged for generating a signal indicative of a location where the interaction device 1 is touched. To provide this indication, the appropriate coordinate values or index value may be used to encode the location.

The electronic representation of the shape of the physical model may be available on the computer 2. This electronic representation may be linked to images, such as CT, MR, US, or 3D rotational angiography images, for example via model-based segmentation or by adaptive mesh registration. The electronic representation of the shape of the physical model may also be linked to clinical information by an ontology associated with the electronic model. On the physical model the user can interactively "point out", "mark" or "draw" relevant structures by touching the physical heart with a finger, a pen-shaped object or any suitable device (see FIG. 1). Depending on the actual context of the application, the information generated by such events may be used by the system to reformat images, select points for measurements, annotate specific structures or select information for reporting.

As shown in FIG. 1, the object represented by the interaction device and three-dimensional object dataset can be a heart. However, this is not a limitation. Other kinds of possible objects include a breast, a bone, a liver, a kidney, and a brain. Combinations of organs, in their natural spatial relationship, can also be modeled this way. Still other kinds of objects include a whole body. The object may also comprise an artifact. Examples of such artifacts may be found in the field of construction applications, wherein the object may comprise a building or a part of a building, or any other object, for example a utensil or a piece of furniture. In such applications, the interaction device may be used to aid the design of such an artifact.

It is also possible that the interaction device is specifically made for use with a particular three-dimensional object dataset. For example, the three-dimensional object dataset may be processed to generate a model, for example a stereolithography (STL) model, that can be printed to generate a three-dimensional physical object by an STL printer.

The surface of the object generated by stereolithography may be made touch-sensitive by applying a touch-sensitive foil.

The physical 3D model may be manufactured using a non-conductive material. The surface of the model may be "smoothed" to facilitate covering the physical model with a touch sensitive foil for interaction. For example, if the interaction device represents a heart model, the surface of the heart model may be smoothed compared to regular plastic heart models, to remove some of the bumps and/or holes from the model. A suitable foil that fits around the physical 3D model may be pre-formed in the same shape as the physical 3D model. Alternatively, a general, flexible foil may be folded around the physical model.

For realizing the user interaction functionality, the touch-sensitive surface may be sensitive to touches by an appropriate object. For example, the touch-sensitive surface may be sensitive to human fingers or human skin in general. Alternatively or additionally, the surface may be sensitive to touch by a stylus. Sensing technology that can be used includes resistive touch sensors and capacitive touch sensors. The locations of the interaction device that are touched with a finger, a pen-shaped object or any other suitable device are related to the three-dimensional object dataset, for example an electronic shape model. To establish this relation, corresponding landmarks may be indicated both on the physical model and on the electronic model. For example, a computer can indicate points in the electronic model on a display and invite a user to touch the corresponding point on the physical model. The signals generated by the interaction device are captured by the computer and used to obtain calibration information. Alternatively, pre-defined landmarks may be encoded in the electronic heart model and indicated in a predefined order on the physical heart model. Using these landmarks and interpolation methods for the positions in between these landmarks, positions indicated on the physical heart can be mapped onto the electronic heart model.

Figure 3:
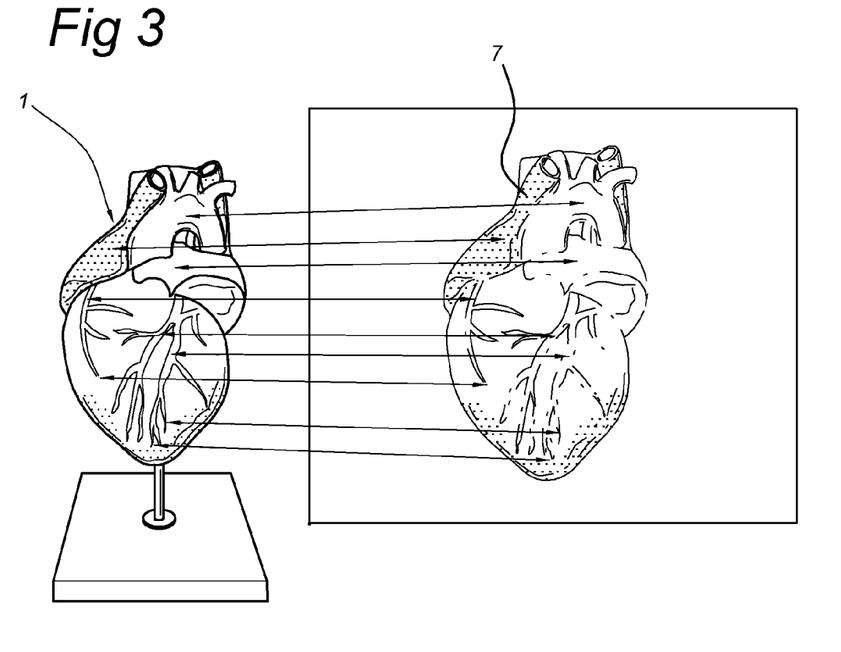
FIG. 3 is a diagram showing the correspondence between an interaction device and a three-dimensional object dataset.

Alternatively or additionally, an automated calibration process may be used. The automated calibration process may involve performing an automatic registration of the three-dimensional object dataset with the electronic representation of the shape of the physical model. Existing techniques may be used to perform such a registration. For example, a segmentation process of the three-dimensional object dataset may be performed, to obtain a first shape model. The electronic representation of the shape of the physical model may have the form of a second shape model. Using adaptive shape model techniques, either model may be adapted to the other, to obtain a correspondence between the first shape model and the second shape model. Since the first shape model is closely related to the three-dimensional object dataset, and the second shape model is closely related to the physical model, and the signal received from the interaction device can be resolved to a point of the second shape model, a point-to-point mapping between the physical model and the three-dimensional object dataset is obtained. Such a point-to-point correspondence is schematically indicated in FIG. 3 by the arrows that connect points on the physical model/interaction device 1 and the graphical display of the three-dimensional object dataset 7.

Besides touch-sensitive surfaces that are sensitive to touch by a finger or by an object, other kinds of indication methods can be used in conjunction with the surface of the interaction device 1. For example, the surface can comprise light detectors, and the user may be given a laser pen or another device that can produce a focused light bundle. The user can then indicate a position on the surface by pointing the laser beam or light bundle to the desired position. Other kinds of radiation transmitters and receivers, such as sound, including ultrasound, or electromagnetic waves, may be used to indicate a position on the surface. Alternatively, the user's hand or an object held by the user can be traced using one or more cameras. Using image processing techniques, the indicated position may be resolved. Also, a disturbance of an electromagnetic field caused by the presence of an object such as a human finger in the vicinity of the surface, for example, may be detected by a sensor, such as an RF coil, embedded in the surface.

To realize further functionality, names of parts of the object can be associated with different parts of the electronic heart model. For example, anatomical names of parts, such as the right coronary artery or the left coronary artery, of an organ, such as the heart, may be defined and associated with corresponding parts of the physical model and/or the three-dimensional object dataset. The names may be represented by an ontology. For example, by pointing to a specific structure, such as a valve, on the interaction device, related functionality may be invoked and, for instance, all available information of the patient regarding this valve may be found (e.g. by a text search in the patient record and previous reports), retrieved, and/or displayed. As another example, possible diseases associated with this anatomical part may be selected from an encyclopedia and displayed. In addition, the model can be matched to images using model-based segmentation as described above. After this matching process, the physical heart model can also be used to select specific views (short axis, long axis) or to show the image location corresponding to a point indicated on the physical model. By indicating points on the physical model also other functionality such as manual annotations, measurements etc can be invoked.

Figure 4:
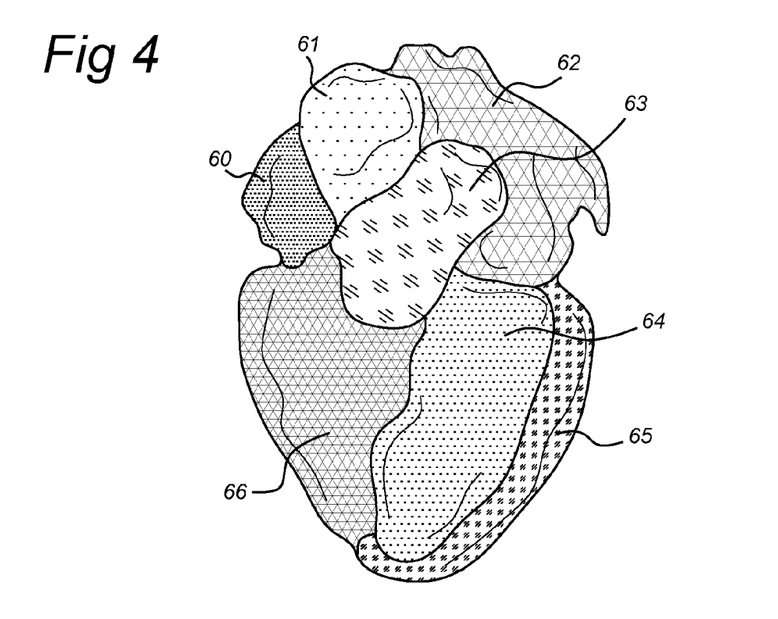
FIG. 4 is a sketch of an interaction device.

For example, FIG. 4 shows different anatomical parts of a physical heart model of an interaction device. The parts shown, as an example, are the right atrium 60, the aorta 61, the pulmonary veins 62, the pulmonary artery 63, the left ventricle 64 and 65, and the right ventricle 66. The corresponding parts of the touch sensitive surface may be associated with these terms of an ontology.

The invention can also be used in combination with clinical workstations, interventional systems, and/or applications, where interaction and manipulation of images and information is envisaged.

For example, the shape of the interaction device may represent an average shape of the particular kind of object. This way, the interaction device, or the physical model, can be re-used for a large number of three-dimensional object datasets that may be used in routine practice. For example, a physical model of an average heart can be used to interact with any three-dimensional object dataset that represents an actual heart of a patient. Here, the word 'average' should be taken to mean that the model is representative of a particular class of objects. Such an average model may be human-designed to include the main features found in most three-dimensional object datasets that may appear in routine practice. It is possible to prepare a plurality of physical objects and include those in a single interaction device. Alternatively, a plurality of interaction devices may be provided, each interaction device comprising a single physical model. For example, physical models of different organs may be provided. Also, biological variations may be dealt with by providing different physical models for different biological variations. For example, different physical heart models may be prepared for different commonly-encountered arrangements of the coronary arteries.

Figure 2:
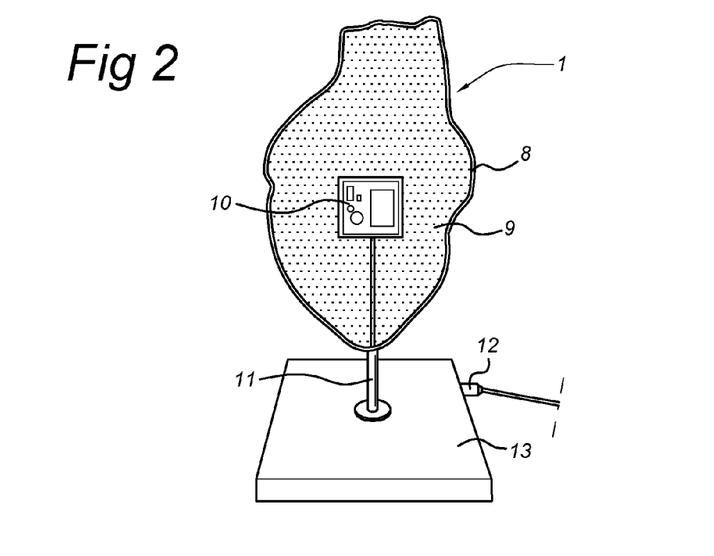
FIG. 2 is a cross sectional view of an interaction device.

FIG. 2 illustrates schematically a cross section of an interaction device 1. The exemplary interaction device 1 shown represents the shape of an average heart. Other kinds of objects may also be represented by an interaction device. The interaction device 1 as illustrated comprises a horizontal plate 13 and a vertical shaft 11 as an example of a support of the interaction device 1. The interaction device 1 further comprises a rigid (or somewhat flexible) model 9 of the heart. The model 9 may be made of a molded plastic, for example. The outer surface of the model 9 is covered by a touch-sensitive foil 8 or layer. This foil may be prepared to have the shape of the surface of a heart, and may be arranged on the surface of the model 9. The model 9 may be hollow or solidfilled. The foil 8 comprises the touch sensitive surface. Other ways to create a touch sensitive surface on top of the model surface 9 may be available in the art. Examples of touch-sensitive foil that can be shaped by curving it are known in the art per se. Such a curved touch-sensitive foil may be wrapped around a model 9 having the shape of the object. The model 9 may be simplified to have, for example, a cylindrical or conical shape. Such shapes would allow more kinds of known touch-sensitive surfaces, including flexible touch sensitive displays, to be used. For example, the multitouch "Skin" product by Displax Interactive Systems, Adanfe-Braga, Portugal, is capable of transforming any non-conductive flat or curved surface into a multitouch screen. The interaction device 1 may further comprise electronic devices, schematically indicated at numeral 10, such as a power supply and/or a processor. The power supply may be used to convert an input power voltage to a voltage that is suitable to be used by the touch-sensitive surface 8 and/or the processor. The processor may be operatively connected to the touch sensitive surface 8 and used to control the touch sensitive surface 8 and/or to process signals produced by the touch sensitive surface 8. The processor may generate an output signal that may be transmitted via a connector 12 to a device external of the interaction device 1, for example the workstation 2. A wireless communication chip and/or an antenna may also be provided, for example as part of the electronics indicated at numeral 10, for wireless transmission of the generated signal.

Figure 5:
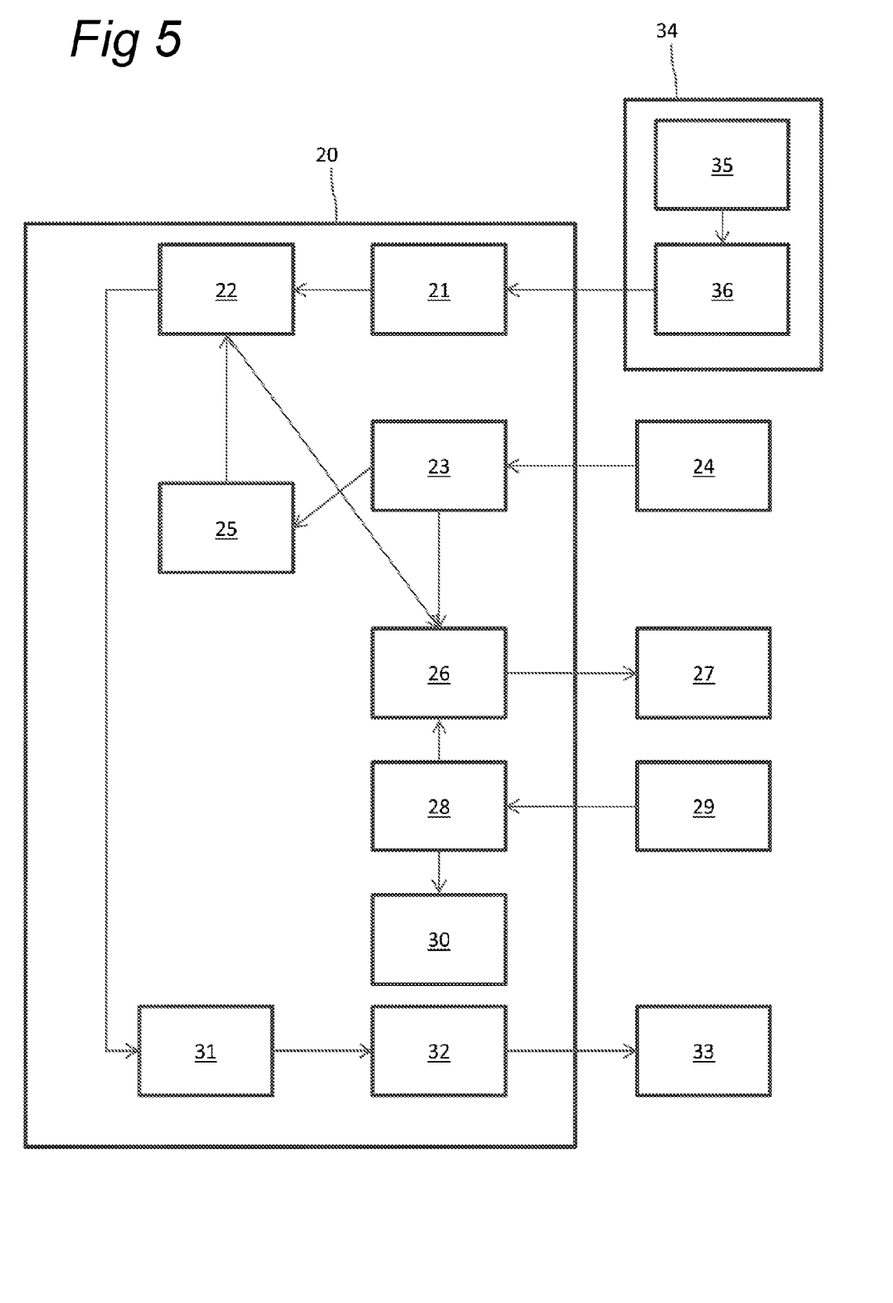
FIG. 5 is a diagram of a system for interacting with a three-dimensional object dataset.

FIG. 5 is a diagram showing aspects of a system for interacting with a three-dimensional object dataset. The system comprises a processing system 20 and a physical interaction device 34. Some further components will be described in the following.

Typically, the processing system 20 is arranged for having access to a three-dimensional object dataset representing an object. Example details thereof will be provided hereinafter.

The interaction device 34 may comprise a touch sensitive surface 35 having a shape typical of at least part of the object represented by the three-dimensional object dataset. The shape of the surface being a shape "typical" of at least part of the object, means that the shape of the surface is not necessarily exactly the same as the shape of the object represented by the three-dimensional object dataset. Instead, to enable easy re-use of the interaction device 34, the shape of the touch sensitive surface 35 may be a shape that has the features commonly encountered in a particular class of objects. For example, an interaction device 35 designed to interact with three-dimensional object datasets representing the heart, may have a touch sensitive surface 35 having the shape of a heart anatomy. For example, this shape may have features corresponding to the left and right ventricles and atria, and/or a part of the great vessels joining the atria may be represented, and/or the main coronary arteries may be represented. The coronary arteries may also be indicated on the touch sensitive surface 35 by means of a distinctive color or in another way. This allows easy interaction with the coronary arteries, while the touch sensitive surface 35 can be relatively smooth.

It is possible that a part of the touch sensitive surface represents a cutting plane of the particular kind of object. For example, the interaction device 34 models half of the object, and the cut plane is also at least partly touch sensitive. It is also possible that the interaction device 34 comprises several parts that each represent a different portion of the object, and that can be put together to build the complete object. This way, touch sensitive surfaces of sub-objects and/or cutting planes may be made accessible to be touched. The different parts may communicate with the processing unit 20 and/or with each other by means of wireless or wired communication technology.

For example, the interaction device comprises a movable part that is movable with respect to a remainder of the interaction device and wherein the movable part and the remainder represent different parts of the object, and the movable part is arranged for being united with and separated from the remainder part, wherein at least part of the touch sensitive surface is covered by the movable part when the movable part is united with the remainder part.

The touch sensitive surface may be based on any known touch sensitive technology, such as resistive or capacitive touch screens. Other kinds of technology, for example based on conductance, may also be used. The touch sensitive surface may be made in the form of a flexible foil that may be wrapped around a support object. The touch sensitive surface may be pre-shaped in the factory to have the appropriated shape. The touch sensitive surface 35 may be sensitive to human skin and/or to a touch event with an artificial object such as a stylus.

The interaction device may further comprise a signal generator 36 for generating a signal to convey a touch event to the processing system 20. The signal may be indicative of a location where the touch sensitive surface 35 is touched.

The processing system 20 may comprise a signal input 21 for receiving the signal from the signal generator 36. The transmission of the signal from the interaction device to the processing system 20 may be through a wireless or wired connection, or any available signal transmission technology.

The processing system may comprise a mapping unit 22 for mapping the touched location, as indicated by the signal, to a corresponding point of the object represented by the three-dimensional object dataset. Such a mapping may be implemented by means of a table mapping points of the touch sensitive surface to points of the object in the three-dimensional object dataset. Such a table may be generated, for example, by means of a calibration procedure in which a sequence of points are indicated by a user both in the three-dimensional object dataset and on the touch sensitive surface 35. The indication in the three-dimensional object dataset during the calibration procedure may be performed using a conventional interaction device, as known in the art, such as a mouse input device. Another, more automated, calibration procedure is described hereinafter.

A scanner 24 may be used to generate the three-dimensional object dataset by scanning an object using, for example, a camera or a radiation source with a corresponding radiation detector. Examples include an x-ray, computed tomography, magnetic resonance, an echographic device, and a photographic device. A photographic device may be used to obtain a three-dimensional object dataset by, for example, stereoscopy. The scanner 24 may be connected to a reconstruction unit 23 of the processor system 20. The reconstruction unit 23 may also be part of an entity separate from the processor system 20. For example, the reconstruction unit 23 may be integrated in the scanner 24. In such a case, the scanner produces a three-dimensional object dataset, such as a volumetric dataset or a surface model or shape model, which is for example stored in a distributed server system that manages a database. However, the processing system 20 may have access to the three-dimensional object dataset via, for example, the distributed server system. These architectural optional details are not drawn in the figure, but will be apparent to the person skilled in the art. The scanner 24 may comprise a medical image scanner capable of scanning at least part of a living body.

The mapping unit 22 may be arranged for mapping the touched location to the corresponding point of the object represented by the three-dimensional object dataset, based on the registration of the three-dimensional object dataset to an electronic representation of the shape of the touch sensitive surface 35. This registration may be performed by the mapping unit 22 itself, or by another entity, such as by a server of the distributed server system. To this end, the electronic representation of the shape of the touch sensitive surface 35 is made available to the device responsible for performing the registration. The electronic representation of the shape of the touch sensitive surface 35 may comprise a representation of a coordinate system that may be used to represent the location where the surface 35 is touched in the signal transmitted from the interaction device 34. This way, after the registration, a received signal can be related to not only a position in the electronic representation of the touch sensitive surface 35, but also to a position in the three-dimensional object dataset. The electronic representation of the shape of the touch sensitive surface 35 may take the form of a surface model or shape model, for example. By using an adaptive shape model to model either the shape of the touch sensitive surface or the object represented in the three-dimensional object dataset, or both, the two shapes can be registered. Other registration methods are available to the person skilled in the art.

The processing system 20 may comprise a graphical unit 26 arranged for displaying at least part of the three-dimensional object dataset. This makes the interaction more relevant for the user, because the user can indicate a point of the displayed three-dimensional object dataset by touching the corresponding point of the touch sensitive surface 35.

The graphical unit 26 may be arranged for displaying an indication of the position within the three-dimensional object dataset corresponding to the location on the touch sensitive surface 35 where the interaction device was touched. This provides immediate feedback to confirm to the user which position was indicated. It enables the user to use the interaction device 34 with more confidence.

A further user input device 29, such as a mouse, a keyboard, or a touch sensitive display, may be provided. The processing system 20 may comprise a user input receiver 28 arranged for receiving a user command from such an input device 29. In response to the user input receiver 28, the command may be executed by the processing system 20 in respect of the position within the three-dimensional object dataset corresponding to the location on the touch sensitive surface 35 where the interaction device 34 was touched.

For example, the command may be to attach an annotation to the indicated position. Such an annotation may comprise a text label, or another symbol, or changing the color of that position or of a sub-object at that position represented by the three-dimensional object dataset. Accordingly, the system may further comprise an annotation unit 30 for, in response to the command received by the user input receiver 28 from the user input device 29, attaching an annotation to the appropriate position within the three-dimensional object dataset. This appropriate position is the position corresponding to the location on the touch sensitive surface 35 where the interaction device 34 was touched. For example, the command is to draw a line through points corresponding to locations that are sequentially touched. It will be understood that, although the command may be given via a conventional input means, it is also possible to enable the user to input commands via the interaction device 34. For example, the touching of the touch sensitive surface 35 may indicate a command, such as an annotation. Other gestures may be defined, such as touching the touch sensitive surface 35 two times or swiping an object such as a finger over the touch sensitive surface. These gestures may be associated with commands.

The system may comprise an ontology 31 comprising a plurality of terms describing different parts of the object. The mapping unit 22 may be arranged for mapping the touched position to a term describing a part of the object corresponding to the touched position. An indication of this term may be displayed to guide the user. Many other applications are possible, such as automatically requesting relevant information, for example from the distributed server system, about this part. This relevant information may be general information about such a part (for example: encyclopedic information about the left atrium, when the left atrium is touched). This relevant information may also be specific information about this part in the object that was actually scanned to obtain the three-dimensional object dataset. An example thereof is a patient in a hospital that has undergone an imaging examination.

A patient record information system 33 may also be provided. For example, this patient record information system 33 is hosted by the distributed server system mentioned above.

The processing system 20 may comprise a connection unit 32 for connecting the system to the patient record information system 33. More particularly, the connection unit 32 may be arranged for retrieving data from a patient data record, based on the term describing the part of the object corresponding to the touched position. This patient data record may be the data record of the patient that was scanned by the scanner 24. However, this is not a limitation. It is also possible to retrieve data from similar cases, for example.

The touch sensitive surface 35 may comprise a touch sensitive display arranged for displaying information, based on the three-dimensional object dataset. This display, similar to the touch sensitive surface, may be shaped similarly to the object in the three-dimensional object dataset. As described, the touch sensitive display may be integrated with the touch sensitive surface 35, for example by means of a multi-layered foil. For example, the touch sensitive display may be used to display further details of the actual three-dimensional object dataset on the touch sensitive surface 35. For example, a scar can be displayed on the physical model, using the touch sensitive display surface. Alternatively, the arteries and/or veins may be displayed. Also, simulation results, an activation time, a planned modification during a future intervention, or any other information associated with the digital model may be displayed on the interaction device.

The processing system 20 may be implemented as a workstation, for example a radiology workstation. The processing system 20 may also at least partly be implemented as part of a distributed server system. For example, the functionality directly relating to user input and display may be implemented in a workstation, and all or some of the remainder, including for example one or more of the mapping unit, the registration unit, the annotation module, the ontology, may be implemented on a server of the distributed server system.

Figure 6:
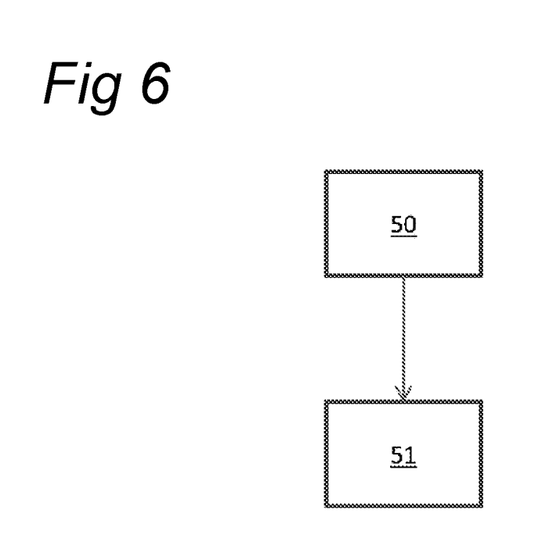
FIG. 6 is a flowchart of a method of interacting with a three-dimensional object dataset.

FIG. 6 illustrates some aspects of a method of interacting with a three-dimensional object dataset. The method comprises step 50 of receiving a signal from an interaction device comprising a touch sensitive surface having a typical shape of at least part of an object represented by the three-dimensional object dataset, wherein the signal is indicative of a location on the touch sensitive surface that is touched. The method comprises further step 51 of mapping the touched location to a corresponding point of the object represented by the three-dimensional object dataset. Further processing steps may be implemented, based on the above description of the system. The method may be implemented in the form of a computer program product.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for annotating a three-dimensional medical image of an anatomic object of a patient, the three-dimensional medical image being based on a signal obtained from a medical image scanner arranged for scanning the three-dimensional anatomic object of the patient, the system comprising:
   a display device that displays at least a part of the three-dimensional medical image of the anatomic object of the patient;
   a three-dimensional interaction device comprising a surface having a typical shape of at least part of a kind of anatomic object represented by the three-dimensional anatomic object of the patient, wherein the interaction device provides a signal that is indicative of a location on the surface that is indicated by a user; and
   a processor that:
   registers the three-dimensional medical image of the anatomic object of the patient to an electronic representation of the shape of the surface of the interaction device to obtain a registration:
   receives the signal that is indicative of the location on the surface indicated by the user
   maps the indicated location to a corresponding point of the medical image of the anatomic object of the patient based on the registration;
   receives a user provided annotation; and
   attaches the user provided annotation to a position within the three-dimensional medical image of the anatomic object of the patient corresponding to the location on the surface indicated by the user.

2. The system of claim 1, wherein the surface comprises a touch sensitive surface, and the signal is indicative of a location on the touch sensitive surface that is touched.

3. The system of claim 1, wherein the processor displays an indication of the position within the three-dimensional medical image corresponding to the location on the surface indicated by the user.

4. The system of claim 1, wherein the processor is further configured to receive a command to be executed with respect of the position within the three-dimensional medical image corresponding to the location on the surface indicated by the user.

5. The system of claim 1, further comprising an ontology comprising a plurality of terms describing different parts of the object, and wherein the processor maps the indicated position to a term describing a part of the anatomic object of the patient corresponding to the indicated position.

6. The system of claim 1, wherein the surface comprises a display arranged for displaying information based on the three-dimensional medical image.

7. A workstation comprising a system of claim 1.

8. The system of claim 1, wherein the shape of the interaction device represents an average shape or a modeled shape of the anatomic object of the patient represented by the three-dimensional medical image.

9. A method of annotating a three-dimensional medical image of a patient, comprising
obtaining the three-dimensional medical image by obtaining a signal from a scanner arranged for scanning a particular anatomic object of the patient;
receiving a signal from an interaction device comprising a touch sensitive surface having a typical shape of at least part of a kind of object represented by the anatomic object of the three-dimensional medical image, wherein the signal is indicative of a location on the touch sensitive surface that is indicated by a user;
registering the anatomic object of the three-dimensional medical image to an electronic representation of the shape of the surface of the interaction device to obtain a registration; and
mapping the indicated location to a corresponding point of the anatomic object of the patient based on the registration;
receiving a user provided annotation; and
attaching the user provided annotation to a position within the three-dimensional medical image corresponding to the location on the surface indicated by the user.

10. A non-transitory computer readable medium comprising instructions for causing a processor system to perform the method of claim 9.

11. The method of claim 9, including receiving a command to be executed with respect of the position within the three-dimensional medical image corresponding to the location on the surface indicated by the user.

12. A non-transitory computer-readable medium comprising a program that, when executed by a processor, causes the processor to:
receive a three-dimensional medical image of an anatomic object of a patient that includes an image of the anatomic object of the patient;
display at least a part of the medical image on a display device;
receive an electronic representation of a three-dimensional interaction device, the interaction device having a surface corresponding to a typical shape of a kind of anatomic object representing the anatomic object of the patient;
register the electronic representation of the interaction device to the image of the anatomic object of the patient to create a registration;
receive a signal corresponding to a touch of the surface by a user, the signal indicating a location of the touch on the interaction device;
map the location of the touch to a corresponding location of the image of the anatomic object of the patient;
receive an annotation from the user; and
attach the annotation to the image of the anatomic object of the patient at the corresponding location of the image.

13. The medium of claim 12, wherein the three-dimensional medical image is provided by a medical scan device.

14. The medium of claim 12, wherein the program causes the processor to display the annotation on the display device.

15. The medium of claim 12, wherein the surface of the interaction device comprises a touch-sensitive surface.

16. The medium of claim 12, wherein the surface of the interaction device includes a display surface, and the program causes the processor to display at least a portion of the medical image on the display surface.

17. The medium of claim 12, wherein the program causes the processor to display an indication of the location of the image corresponding to the location of the touch.

18. The medium of claim 12, wherein the program causes the processor to receive a command from the user related to the location of the touch, and to execute the command based on the location of the touch.

19. The medium of claim 12, wherein the program causes the processor to access an ontology comprising a plurality of terms describing parts of a body, and the annotation includes a term of the plurality of terms corresponding to a part of the anatomic object of the patient at the location of the touch.

20. The medium of claim 12, wherein the program causes the processor to access a medical record of the patient and to display information from the medical record of the patient related to the anatomic object of the patient.

* * * * *